US012638728B2

(12) United States Patent
Watanabe et al.

(10) Patent No.: US 12,638,728 B2
(45) Date of Patent: May 26, 2026

(54) DISPLAY APPARATUS AND ARRAY SUBSTRATE

(71) Applicant: Magnolia White Corporation, Tokyo (JP)

(72) Inventors: Kyosuke Watanabe, Tokyo (JP); Jin Hirosawa, Tokyo (JP); Junko Nagasawa, Tokyo (JP)

(73) Assignee: Magnolia White Corporation, Tokyo (JP)

( * ) Notice: Subject to any disclaimer, the term of this patent is extended or adjusted under 35 U.S.C. 154(b) by 249 days.

(21) Appl. No.: 18/731,447

(22) Filed: Jun. 3, 2024

(65) Prior Publication Data

US 2024/0419040 A1     Dec. 19, 2024

(30) Foreign Application Priority Data

Jun. 19, 2023     (JP) ................................. 2023-099931

(51) Int. Cl.
*G02F 1/1368* (2006.01)
*G02F 1/1343* (2006.01)

(52) U.S. Cl.
CPC ........ *G02F 1/13439* (2013.01); *G02F 1/1368* (2013.01); *G02F 2201/38* (2013.01)

(58) Field of Classification Search
CPC ............... G02F 1/13439; G02F 1/1368; G02F 1/136227

See application file for complete search history.

(56) References Cited

U.S. PATENT DOCUMENTS

| | | | |
|---|---|---|---|
| 11,604,390 B2 | 3/2023 | Watanabe | |
| 2022/0163857 A1* | 5/2022 | Watanabe | H10D 86/60 |
| 2023/0061880 A1* | 3/2023 | Watanabe | G02F 1/136209 |

FOREIGN PATENT DOCUMENTS

JP     2022-084146 A     6/2022

* cited by examiner

*Primary Examiner* — James A Dudek

(74) *Attorney, Agent, or Firm* — Michael Best & Friedrich LLP

(57) ABSTRACT

In a display apparatus, reflection of external light is reduced in order to improve visible recognition. A first organic insulating film is provided with a contact hole, and the contact hole includes: a pixel electrode being in contact with an inner wall of the contact hole; a capacitance insulating film being in contact with the inner wall of the contact hole and the pixel electrode; a common electrode being in contact with the capacitance insulating film; and a second organic insulating film being in contact with the common electrode and filling the contact hole, that are formed therein. An upper side of the contact hole includes: a conductive film being in contact with the second organic insulating film; and an antireflection film being in contact with the conductive film, that are formed therein.

10 Claims, 10 Drawing Sheets

DISPLAY APPARATUS AND ARRAY SUBSTRATE

CROSS-REFERENCE TO RELATED APPLICATION

The present application claims priority to Japanese Patent Application No. 2023-99931 filed on Jun. 19, 2023, the disclosure of which is incorporated herein by reference.

TECHNICAL FIELD OF THE INVENTION

The present invention relates to a display apparatus and an array substrate, and relates to, for example, a technique effectively applied to a display apparatus and an array substrate including a conductive film being in contact with a common electrode.

BACKGROUND OF THE INVENTION

Japanese Patent Application Laid-open Publication No. 2022-84146 (Patent Document 1) discloses a metal wiring including a first portion that entirely covers a surface of a common electrode inside a contact hole provided in an organic insulating film, and a second portion that covers the surface of the common electrode outside the contact hole.

SUMMARY OF THE INVENTION

In a display apparatus, it is desirable to reduce reflection of external light in order to improve visible recognition.

A display apparatus according to an embodiment includes: a first organic insulating film; a pixel electrode being in contact with the first organic insulating film; a capacitance insulating film being in contact with the pixel electrode; a common electrode being in contact with the capacitance insulating film; a conductive film being in contact with the common electrode; and an antireflection film being in contact with the conductive film. The first organic insulating film is provided with a contact hole. The contact hole includes: the pixel electrode being in contact with an inner wall of the contact hole; the capacitance insulating film being in contact with the inner wall of the contact hole and the pixel electrode; the common electrode being in contact with the capacitance insulating film; and a second organic insulating film being in contact with the common electrode and filling the contact hole, that are formed therein. An upper side of the contact hole includes: the conductive film being in contact with the second organic insulating film; and the antireflection film being in contact with the conductive film, that are formed therein.

An array substrate according to an embodiment includes a switching element. This array substrate includes: a first organic insulating film; a pixel electrode being in contact with the first organic insulating film; a capacitance insulating film being in contact with the pixel electrode; a common electrode being in contact with the capacitance insulating film; a conductive film being in contact with the common electrode; and an antireflection film being in contact with the conductive film. The first organic insulating film is provided with a contact hole. The contact hole includes: the pixel electrode being in contact with an inner wall of the contact hole; the capacitance insulating film being in contact with the inner wall of the contact hole and the pixel electrode; the common electrode being in contact with the capacitance insulating film; and a second organic insulating film being in contact with the common electrode and filling the contact hole, that are formed therein. An upper side of the contact hole includes: the conductive film being in contact with the second organic insulating film; and the antireflection film being in contact with the conductive film, that are formed therein.

BRIEF DESCRIPTIONS OF THE DRAWINGS

DESCRIPTIONS OF THE PREFERRED EMBODIMENTS

Figure 1:
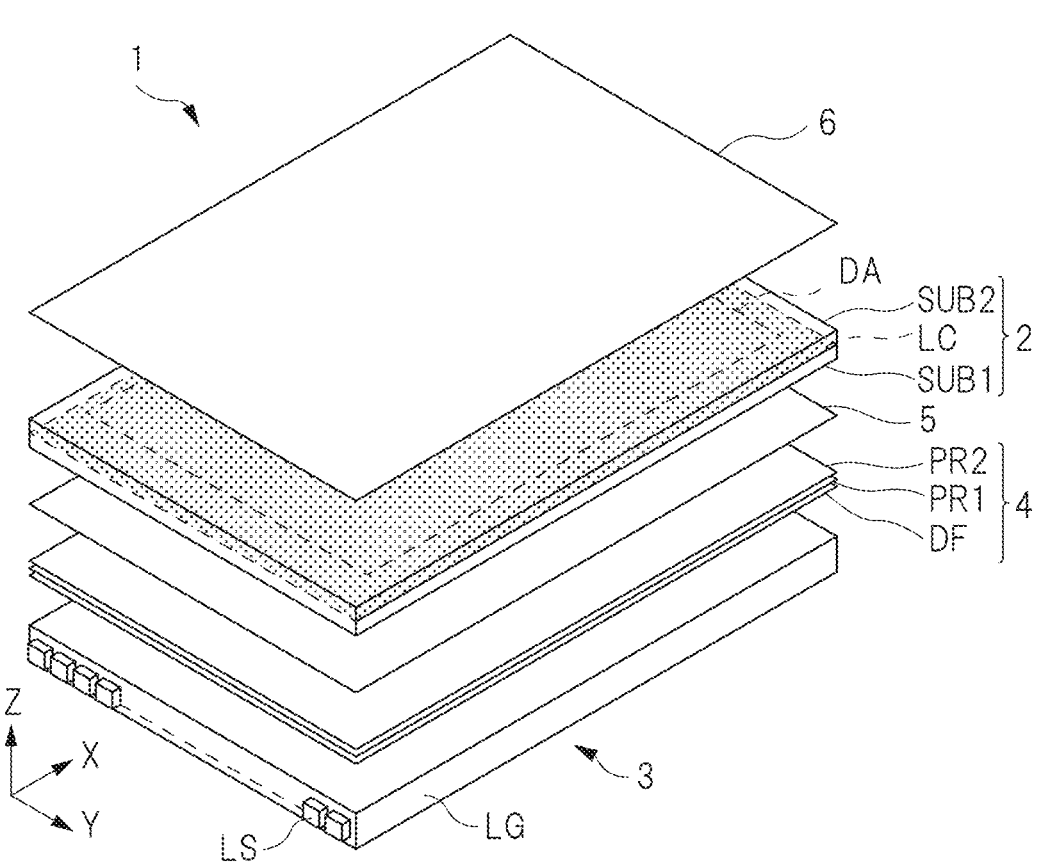
FIG. 1 is an exploded perspective view illustrating a schematic configuration example of a liquid crystal display apparatus.

Hereinafter, embodiments will be explained with reference to the drawings.

Note that the present disclosure is only one example, and appropriate modification with keeping the idea of the present invention which can be anticipated by those who are skilled in the art is obviously within the scope of the present disclosure.

Also, in order to make the explanation clear, a width, a thickness, a shape, and others of each portion in the drawings are schematically illustrated more than those in an actual aspect in some cases. However, the illustration is only one example, and does not limit the interpretation of the present disclosure. In the present specification and each drawing, similar elements to those illustrated in the already-described drawings are denoted with the same reference characters, and detailed explanation for them is appropriately omitted in some cases.

In the present embodiment, for example, a liquid crystal display apparatus including a liquid crystal display element is disclosed. However, the embodiment does not prevent the application of the technical idea disclosed in the embodiment to a display apparatus including another type of display element represented by, for example, an organic electroluminescence display element, a micro LED, or a mini LED. In addition, the technical idea disclosed in the embodiment is also applicable to an electronic device or an array substrate including a sensor element represented by a capacitive sensor, an optical sensor, or the like.

<Overall Configuration of Liquid Crystal Display Apparatus>

FIG. 1 is an exploded perspective view illustrating a schematic configuration example of a liquid crystal display apparatus 1. As illustrated in FIG. 1, an X direction, a Y direction, and a Z direction are defined. The X direction, the Y direction, and the Z direction are directions orthogonal to one another, but may intersect one another at an angle other than a vertical angle. Viewing the liquid crystal display apparatus 1 and components thereof in parallel with the Z direction is referred to as "plan view". In addition, the direction indicated by the arrow of the Z direction may be referred to as "upper side", and the opposite direction may be referred to as "lower side".

In FIG. 1, the liquid crystal display apparatus 1 includes a display panel 2 and a backlight 3. For example, the backlight 3 can be made of a side-edge-type backlight including a light guide body LG facing the display panel 2 and a plurality of light emitting elements LS arranged at positions facing a side surface of the light guide body LG. However, the backlight 3 is not limited to this example, and a backlight with various configurations that can supply light required for image display can be adopted.

The planar shape of each of the display panel 2 and the light guide body LG is made of, for example, a rectangular shape having a long side along the X direction and a short side along the Y direction, but is not limited to the rectangular shape, and may be made of another shape.

The display panel 2 is a liquid crystal panel having light transmitting property, and includes, for example, an array substrate SUB1, a counter substrate SUB2 facing the array substrate SUB1, and a liquid crystal layer LC filling to seal a gap between the array substrate SUB1 and the counter substrate SUB2. The display panel 2 configured as described above includes, for example, a rectangular display region DA.

The liquid crystal display apparatus 1 further includes an optical sheet group 4, a polarizer 5 and a polarizer 6. The optical sheet group 4 is arranged between the light guide body LG and the display panel 2. For example, the optical sheet group 4 includes a diffusion sheet DF that diffuses light emitted from the light guide body LG and a prism sheet PR1 and a prism sheet PR2 each including a large number of prisms formed therein.

The polarizer 5 is arranged between the optical sheet group 4 and the array substrate SUB1. On the other hand, the polarizer 6 is arranged on the upper side of the counter substrate SUB2. Here, a relationship between a polarization axis of the polarizer 5 and a polarization axis of the polarizer 6 is a crossed-Nicols relationship in which the polarization axes are orthogonal to each other.

The liquid crystal display apparatus 1 configured as described above can be used for various types of devices represented by, for example, a head mounted display, an in-vehicle device, a smartphone, a tablet terminal device, a mobile phone, a personal computer, a television receiver, and a game device.

<Configuration of Display Panel>

Figure 2:
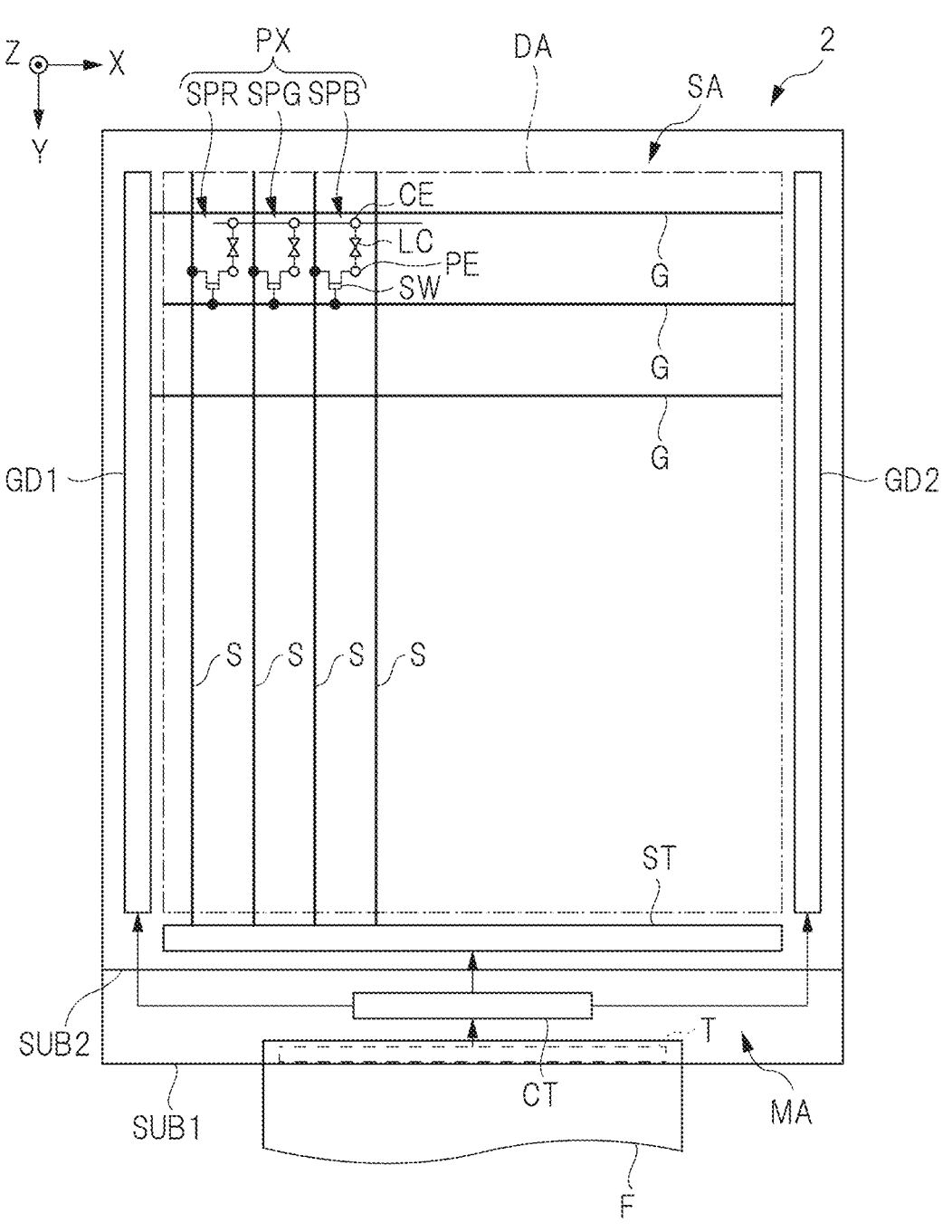
FIG. 2 is a plan view illustrating an outline configuration of a display panel.

Next, a configuration of the display panel 2 will be explained. FIG. 2 is a plan view illustrating an outline configuration of the display panel 2. In FIG. 2, the display panel 2 includes the display region DA and a peripheral region SA around the display region DA. For example, as illustrated in FIG. 2, a lower side of the array substrate SUB1 protrudes from the counter substrate SUB2 in the Y direction. Thus, the array substrate SUB1 includes a mounting region MA that does not overlap the counter substrate SUB2 in a plan view. The mounting region MA configures a part of the peripheral region SA.

In the display region DA, a plurality of pixels PX are arranged in a matrix pattern. The pixel PX includes a plurality of subpixels. For example, in FIG. 2, the pixel PX includes a red subpixel SPR, a green subpixel SPG, and a blue subpixel SPB. However, the pixel PX is not limited to such a configuration, and may be configured to include subpixels of other colors represented by white.

As illustrated in FIG. 2, the display panel 2 includes a plurality of scan lines G, a plurality of signal lines S (video lines), a scanning driver GD1, a scanning driver GD2, and a selector circuit ST. The plurality of scan lines G extend in the X direction and also are arranged in the Y direction. On the other hand, the plurality of signal lines S extend in the Y direction and also are arranged in the X direction. Each of the plurality of scan line G is connected to the scanning driver GD1 or the scanning driver GD2. On the other hand, each of the plurality of signal lines S is connected to the selector circuit ST.

Next, as illustrated in FIG. 2, a controller CT is mounted on the mounting region MA. In addition, a terminal portion T is provided on the mounting region MA, and a flexible substrate F is connected to the terminal portion T. Note that the controller CT may be mounted on the flexible substrate F. The controller CT is made of, for example, an IC chip or a circuit element.

Various types of signals transmitted from the electronic device on which the liquid crystal display apparatus 1 is mounted are output to the controller CT via an integrated circuit mounted on the flexible substrate F. The controller CT receives such a signal as its input, supplies a video signal to the selector circuit ST, and controls the scanning driver GD1, the scanning driver GD2, and the selector circuit ST.

Each of the scanning driver GD1 and the scanning driver GD2 sequentially supplies a scan signal to the plurality of scan lines G. On the other hand, the selector circuit ST sequentially supplies the video signal input from the controller CT to the signal line S.

The pixel PX is configured to include a pixel electrode PE, a switching element SW (thin film transistor), and a common electrode CE to which a common potential is supplied. The switching element SW is connected to the pixel electrode PE, the scan line G, and the signal line S.

For example, if the switching element SW is made of a thin film transistor (field effect transistor), a gate electrode of the thin film transistor is electrically connected to the scan line G. Further, a source of the thin film transistor is electrically connected to the signal line S while a drain of the thin film transistor is electrically connected to the pixel electrode PE.

Here, by the supply of the scan signal to the scan line G, the thin film transistor is turned on, and the video signal supplied to the signal line S is supplied to the pixel electrode PE. On the other hand, the common electrode CE is formed over the plurality of subpixels, and a potential difference is generated between the pixel electrode PE and the common electrode CE by the supply of the video signal to the pixel electrode PE. As a result of the act of the electric field generated by this on the liquid crystal layer LC, orientation directions of a plurality of liquid crystal molecules configuring the liquid crystal layer LC are controlled.

For example, in a so-called "vertical electric field mode" in which the liquid crystal layer LC is interposed between the pixel electrode PE and the common electrode CE since the pixel electrode PE is formed on the array substrate while the common electrode CE is formed on the counter substrate, the orientation directions of the plurality of liquid crystal molecules configuring the liquid crystal layer LC are controlled by a vertical electric field generated between the pixel electrode PE and the common electrode CE.

On the other hand, for example, in a so-called "transverse electric field mode" in which the pixel electrode PE and the common electrode CE are formed on the array substrate while a transverse electric field (fringe electric field) leaking from a slit in the common electrode CE is used, the orientation directions of the plurality of liquid crystal molecules configuring the liquid crystal layer LC arranged on the upper side of the array substrate are controlled by the transverse electric field leaking from the slit.

As described above, the modes for controlling the orientation directions of the liquid crystal molecules include the "vertical electric field mode" and the "transverse electric field mode". For example, the "transverse electric field mode" has an advantage that the viewing angle can be made wider than that of the "vertical electric field mode". The present embodiment adopts the "transverse electric field mode" in which the scan line G, the signal line S, the scanning driver GD1, the scanning driver GD2, the selector circuit ST, the switching element SW, the pixel electrode PE, and the common electrode CE are formed on the array substrate SUB1.

<Planar Layout Configuration of Subpixels>

Figure 3:
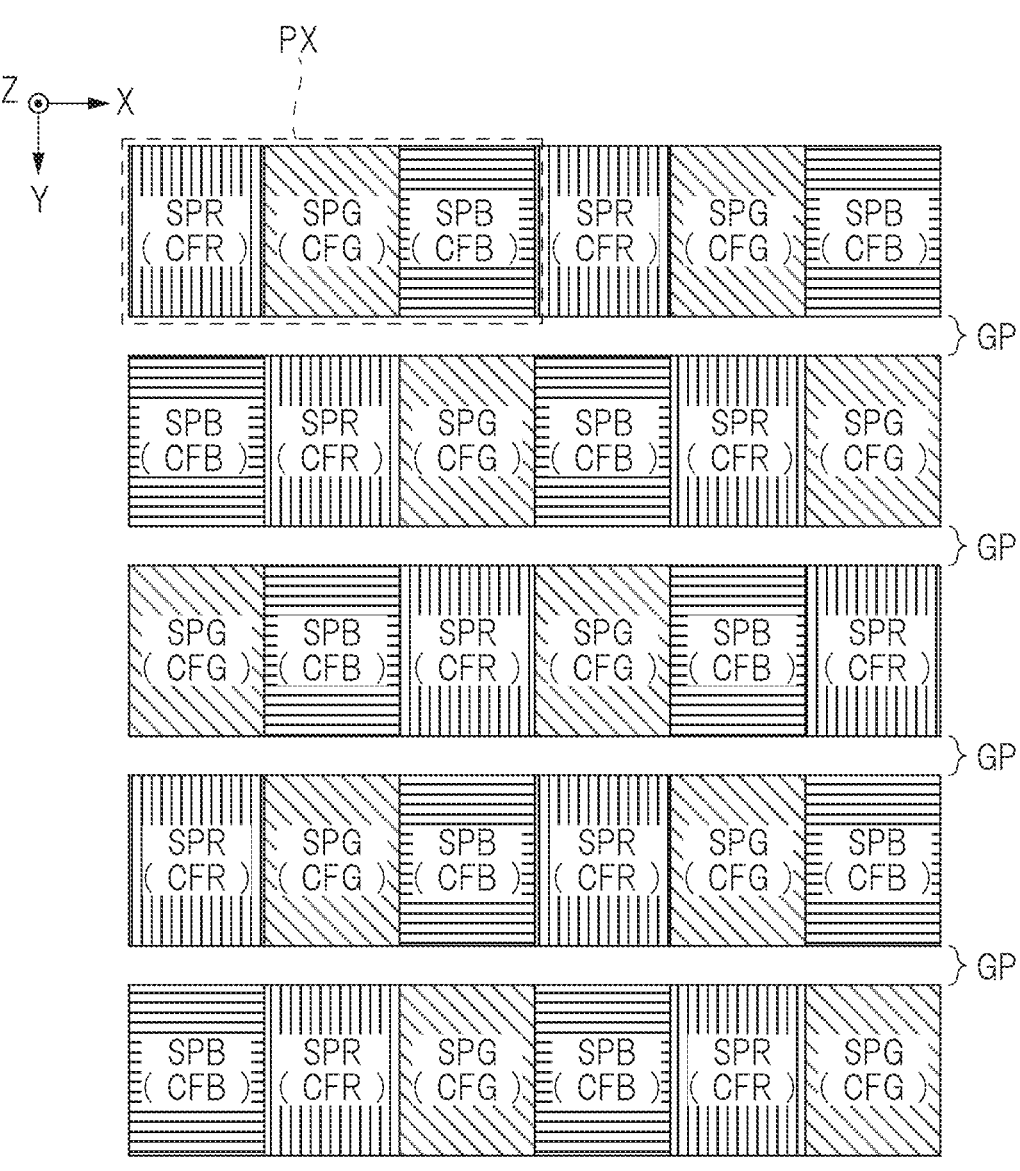
FIG. 3 is a plan view illustrating an example of a planar layout of subpixels.

Next, a planar layout configuration of the subpixels will be explained. FIG. 3 is a plan view illustrating an example of the planar layout of the subpixels. In FIG. 3, the subpixels include a subpixel SPR, a subpixel SPG and a subpixel SPB. A red color filter CFR is arranged in the subpixel SPR, and a green color filter CFG is arranged in the subpixel SPG. Also, a blue color filter CFB is arranged in the subpixel SPB.

As illustrated in FIG. 3, the subpixels SPR, SPG, and SPB are arranged in this order in the X direction. Furthermore, the subpixels SPR, SPB, and SPG are arranged in this order in the Y direction. As a result, the subpixels SPR are arranged in an oblique direction intersecting the X direction and the Y direction. Similarly, the subpixels SPG are aligned in the oblique direction, and the subpixels SPB are aligned in the oblique direction.

The color filters CFR, CFG, and CFB are arranged in a dot pattern (island pattern) with respect to the subpixels SPR, SPG, and SPB.

And, for example, gaps GP are formed between the color filter CFR and the color filter CFG, between the color filter CFG and the color filter CFB, between the color filter CFB and the color filter CFR adjacent to each other in the Y direction, and the like.

Note that the planar layout of the subpixels SPR, SPG, and SPB and the color filters CFR, CFG, and CFB is not limited to the planar layout illustrated in FIG. 3.

For example, the subpixels SPR may be arranged in the Y direction, the subpixels SPG may be arranged in the Y direction, the subpixels SPB may be arranged in the Y direction, and a line of the subpixels SPR, a line of the subpixels SPG, and a line of the subpixels SPB may be sequentially arranged in the X direction.

As described above, the liquid crystal display apparatus 1 according to the present embodiment has so-called "color filter on array (COA) structure" in which all of the color filters CFR, CFG, and CFB are arranged on the array substrate SUB1. According to the "COA structure", the color filters and the subpixels are provided on the same array substrate SUB1. Thus, according to the "COA structure", the high-definition liquid crystal display apparatus 1 can be achieved without being affected by the alignment deviation between the array substrate SUB1 and the counter substrate SUB2.

Figure 4:
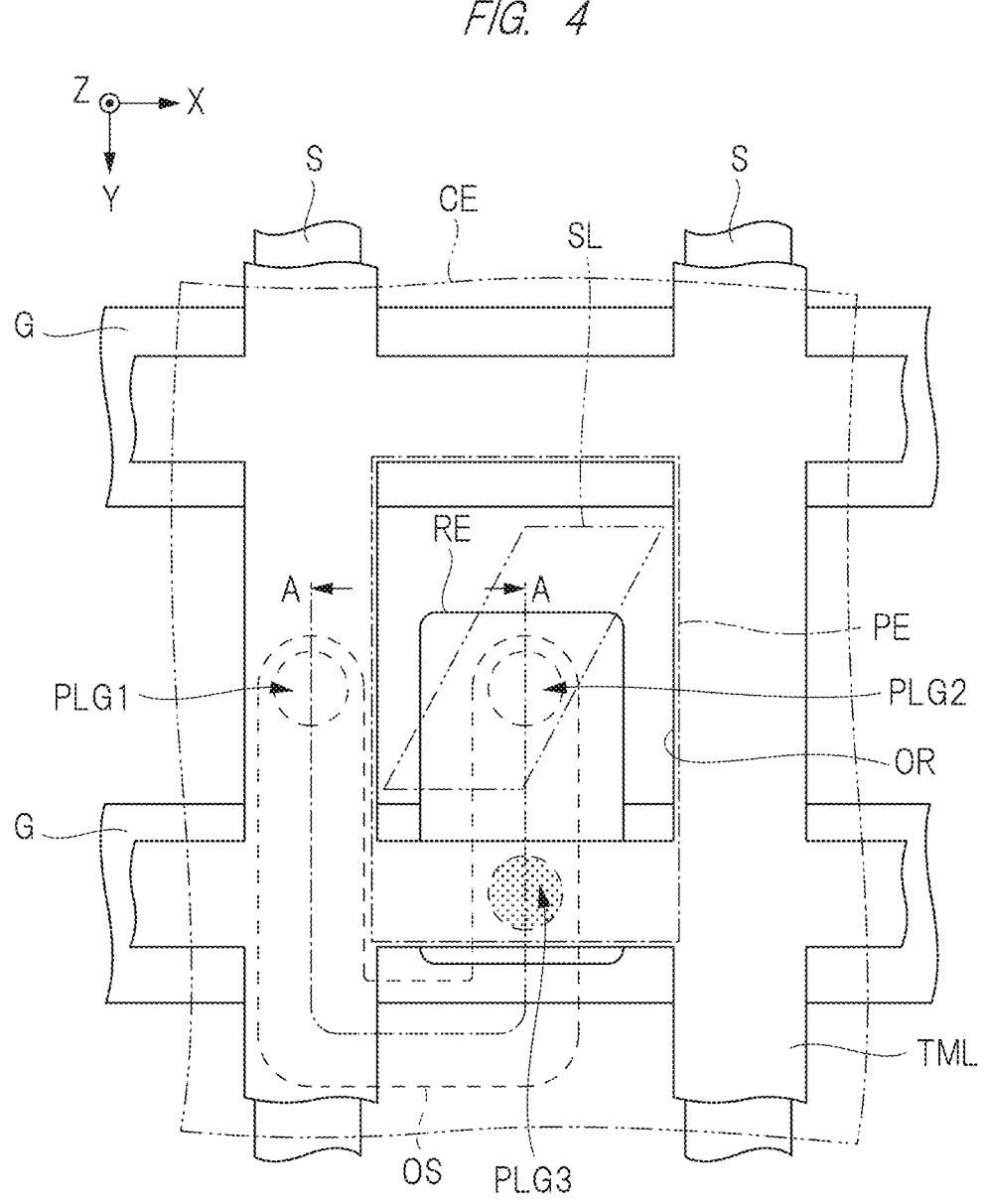
FIG. 4 is an outline plan view illustrating a part of elements configuring the subpixel.

FIG. 4 is an outline plan view illustrating a part of elements configuring the subpixel. FIG. 4 shows two scan lines G extending in the X direction and two signal lines S intersecting these scan lines G and extending in the Y direction. An opening region OR of the subpixel is formed in a region surrounded by the two scan lines G and the two signal lines S. In the opening region OR, the pixel electrode PE is provided so as to overlap the opening region OR in a planar manner.

A conductive film TML is arranged on the upper side of the scan line G and the signal line S. The conductive film TML includes an X-direction extending portion extending in the X direction and a Y-direction extending portion extending in the Y direction. The X-direction extending portion is provided so as to overlap the scan line G in a planar manner. On the other hand, the Y-direction extending portion is provided so as to overlap the signal line S in a planar manner. The conductive film TML has a grid-pattern planar shape made of the X-direction extending portion and the Y-direction extending portion as a whole as illustrated in FIG. 4. The conductive film TML functions as a "light shielding film" that shields light.

Next, as illustrated in FIG. 4, at a contact portion PLG1, the signal line S is connected to a semiconductor layer OS of the thin film transistor configuring the switching element. That is, the semiconductor layer OS is electrically connected to the signal line S via the contact portion PLG1. In this manner, the contact portion PLG1 has a function of electrically connecting the semiconductor layer OS and the signal line S.

Further, the semiconductor layer OS extends so as to intersect the scan line G and reach the opening region OR and is connected to a relay electrode RE at a contact portion PLG2 positioned in the opening region OR. Therefore, at the contact portion PLG2, the semiconductor layer OS is electrically connected to the relay electrode RE. That is, the contact portion PLG2 has a function of electrically connecting the semiconductor layer OS and the relay electrode RE.

Further, the pixel electrode PE is provided so as to overlap the opening region OR in a planar manner, and the pixel electrode PE and the relay electrode RE are connected to each other at a bottom portion of a contact portion PLG3. That is, a part of the pixel electrode PE is formed inside the contact portion PLG3, and the part of the pixel electrode PE formed inside the contact portion PLG3 and the relay electrode RE are electrically connected to each other at the bottom portion of the contact portion PLG3. As described above, the pixel electrode PE is electrically connected to the semiconductor layer OS via the relay electrode RE. That is, the contact portion PLG3 has a function of electrically connecting the pixel electrode PE and the relay electrode RE.

Next, as illustrated in FIG. 4, for example, the common electrode CE is provided so as to overlap the entire elements such as the scan line G, the signal line S, and the conductive film TML in a planar manner. In the opening region OR, the common electrode CE is provided with the slit SL positioned to face the pixel electrode PE.

Here, for example, the electric field generated when the potential difference is generated between the common electrode CE and the pixel electrode PE leaks from the slit SL provided in the common electrode CE. As a result, the orientation directions of the plurality of liquid crystal molecules configuring the liquid crystal layer arranged on the upper side of the array substrate are controlled by the transverse electric field leaking from the slit SL. That is, the slit SL provided in the common electrode CE has a function of applying the transverse electric field for controlling the orientation directions of the plurality of liquid crystal molecules to the liquid crystal layer. As described above, the planar layout configuration of the subpixels is achieved.

<Cross-Sectional Configuration of Subpixel>

Figure 5:
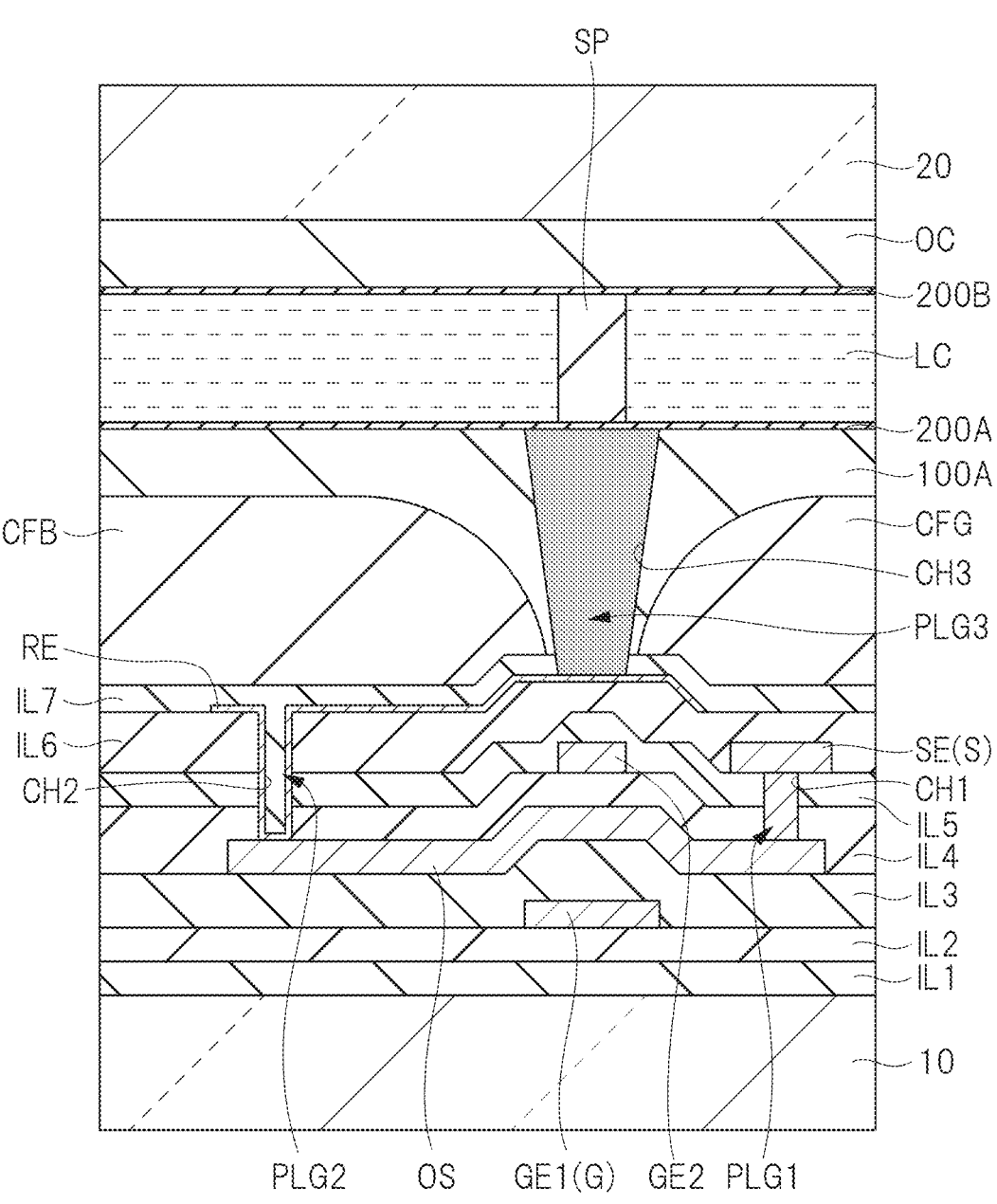
FIG. 5 is a schematic cross-sectional view taken along a line A-A in FIG. 4.

Next, a cross-sectional configuration of the subpixel will be explained. FIG. 5 is a schematic cross-sectional view taken along a line A-A in FIG. 4. Note that FIG. 5 is not a view resulted from accurate reflection of the cross section taken along the line A-A in FIG. 4 but an outline cross-sectional view. For example, although the line A-A in FIG. 4 intersects the scan line G twice, FIG. 5 shows only one scan line G (gate electrode GE1). And, although FIG. 5 shows a gate electrode GE2, FIG. 4 does not show this gate electrode GE2. Further, details of the contact portion PLG3 related to the connection portion between the relay electrode RE and the pixel electrode PE will be explained with reference to FIGS. 6 to 10, and therefore, are omitted in FIG. 5.

In FIG. 5, an insulating layer IL1 is formed on a substrate 10 having light transmitting property. An insulating layer IL2 is formed on the insulating layer IL1. Although the substrate 10 is made of, for example, glass, the present invention is not limited to this example. This may be made of a resin material represented by a polyimide resin. In addition, each of the insulating layer IL1 and the insulating layer IL2 is made of an inorganic insulating film represented by a silicon nitride film or a silicon oxide film.

Subsequently, as illustrated in FIG. 5, a gate electrode GE1 of the thin film transistor (field effect transistor) which is the switching element is formed on the insulating layer IL2. The gate electrode GE1 functions as the scan line G. The gate electrode GE1 is made of, for example, a metal material. The gate electrode GE1 may have a single-layer structure made of a single metal material or may have a multilayered structure in which different types of metal materials are stacked.

Next, an insulating layer IL3 is formed on the insulating layer IL2 so as to cover the gate electrode GE1. And, the semiconductor layer OS is formed on the insulating layer IL3. The insulating layer IL3 is made of, for example, an inorganic insulating film such as a silicon nitride film or a silicon oxide film. On the other hand, the semiconductor layer OS is made of an amorphous silicon film or an oxide semiconductor film.

The semiconductor layer OS functions as a channel of the thin film transistor. That is, the channel is formed in the semiconductor layer OS in accordance with a gate voltage applied to the gate electrode GE1. For example, the channel is formed in the semiconductor layer OS by application of a gate voltage equal to or larger than a threshold voltage to the gate electrode GE1. On the other hand, the channel formed in the semiconductor layer OS is disappeared by application of a gate voltage smaller than the threshold value to the gate electrode GE1.

Accordingly, on-off operations of the thin film transistor can be controlled based on the gate voltage applied to the gate electrode GE1.

For example, the semiconductor layer OS is desirably made of an oxide semiconductor film. This is because a thin film transistor using the oxide semiconductor film as the channel has advantages that are higher electron mobility than that of a thin film transistor using the amorphous silicon film as the channel and very low off-leakage current.

Next, as illustrated in FIG. 5, an insulating layer IL4 is formed on the insulating layer IL3 so as to cover the semiconductor layer OS. And, the gate electrode GE2 is formed on the insulating layer IL4. The insulating layer IL4 is made of, for example, an inorganic insulating film such as a silicon nitride film or a silicon oxide film. On the other hand, the gate electrode GE2 is made of, for example, a metal material. As described above, the thin film transistor includes the gate electrode GE1 and the gate electrode GE2 arranged so as to interpose the semiconductor layer OS from above and below. In this configuration, for example, the channel can be formed on a lower surface of the semiconductor layer OS by the application of the gate voltage equal to or larger than the threshold voltage to the gate electrode GE1 arranged on the lower side of the semiconductor layer OS, and the channel can also be formed on an upper surface of the semiconductor layer OS by the application of the gate voltage equal to or larger than the threshold voltage to the gate electrode GE2 arranged on the upper side of the semiconductor layer OS.

That is, in the thin film transistor according to the present embodiment, the channels can be formed on both the upper surface and the lower surface of semiconductor layer OS, and thus, the current driving force of the thin film transistor can be improved. However, the configuration of the thin film transistor is not limited to this example, and the gate electrode GE2 may be eliminated. Therefore, for example, FIG. 4 does not show the gate electrode GE2.

Next, an insulating layer IL5 is formed on the insulating layer IL4 so as to cover the gate electrode GE2. A source electrode SE is formed on the insulating layer IL5. The source electrode SE functions as the signal line S. The insulating layer IL5 is made of, for example, an inorganic insulating film such as a silicon nitride film or a silicon oxide film. On the other hand, the source electrode SE is made of, for example, a metal material.

Here, as illustrated in FIG. 5, in the insulating layer IL4 and the insulating layer IL5, a contact hole CH1 penetrating through these insulating layers and reaching the semiconductor layer OS is formed. At the contact hole CH1, the source electrode SE is in contact with the semiconductor layer OS. As a result, the contact portion PLG1 at which the conductive material (a part of the source electrode SE) and the semiconductor layer OS are in contact with each other is formed in the contact hole CH1. As a result, at the contact portion PLG1, the source electrode SE is electrically connected to the semiconductor layer OS.

Next, an insulating layer IL6 is formed on the insulating layer IL5 so as to cover the source electrode SE. The insulating layer IL6 is also made of, for example, an inorganic insulating film such as a silicon nitride film or a silicon oxide film. And, as illustrated in FIG. 5, a contact hole CH2 penetrating the insulating layer IL6, the insulating layer IL5, and the insulating layer IL4 and reaching the semiconductor layer OS is formed. At this time, the relay electrode RE is formed from the inside of the contact hole CH2 over the insulating layer IL6. The relay electrode RE is made of, for example, a light transmitting conductive material.

Next, an insulating layer IL7 is formed to fill the inside of the contact hole CH2 and is formed over the insulating layer IL6. The insulating layer IL7 is also made of, for example, an inorganic insulating film such as a silicon nitride film or a silicon oxide film.

Here, the relay electrode RE and the semiconductor layer OS are connected to each other via the contact hole CH2. As a result, since the relay electrode RE and the semiconductor layer OS come into contact with each other at the contact hole CH2, the contact portion PLG2 is formed. As a result, the relay electrode RE is electrically connected to the semiconductor layer OS via the contact portion PLG2. In other words, the relay electrode RE is electrically connected to the drain of the thin film transistor.

And, as illustrated in FIG. 5, the color filter CFB and the color filter CFG are formed on the insulating layer IL7. As a result, in the present embodiment, the "COA structure" is achieved. Next, an organic insulating film 100A is formed so as to cover the color filter CFB and the color filter CFG. The organic insulating film 100A is made of, for example, an organic material represented by an acrylic resin. In the organic insulating film 100A and the insulating layer IL7, a contact hole CH3 penetrating the organic insulating film 100A and the insulating layer IL7 and reaching the relay electrode RE is formed. A plurality of types of components are embedded in the contact hole CH3 to configure the contact portion PLG3. In this manner, the contact portion PLG3 is electrically connected to the semiconductor layer OS (drain side) via the relay electrode RE.

Note that a detailed configuration of the contact portion PLG3 and a detailed structure formed between the organic insulating film 100A and an orientation film 200A will not be explained in FIG. 5. However, the detailed configuration of the contact portion PLG3 and the detailed structure formed between the organic insulating film 100A and the orientation film 200A will be explained with reference to other drawings described later.

Next, as illustrated in FIG. 5, the liquid crystal layer LC is arranged on the upper side of the organic insulating film 100A including the contact portion PLG3 formed therein to interpose the orientation film 200A therebetween, and the upper side of the contact portion PLG3 is provided with a spacer SP. A substrate 20 is arranged on the liquid crystal layer LC to interpose an orientation film 200B and an overcoat film OC therebetween. As described above, the cross-sectional configuration of the subpixels is achieved.

<Operation of Subpixel>

Next, the operation of the subpixel will be briefly explained. For example, by supply of the scan signal to the gate electrode GE1 and the gate electrode GE2 of the thin film transistor that is one of the components of the subpixel, the gate voltage equal to or larger than the threshold voltage is applied to each of the gate electrode GE1 and the gate electrode GE2. Accordingly, the channel is formed on both the lower surface and the upper surface of the semiconductor layer OS interposed between the gate electrode GE1 and the gate electrode GE2. As a result, the source and the drain of the thin film transistor are electrically connected to turn on the thin film transistor. At this time, for example, by supply of the video signal to the source electrode SE of the thin film transistor, this video signal is transmitted via the turned-on thin film transistor to the relay electrode RE electrically connected to the drain of is the semiconductor layer OS. Then, the video signal transmitted from the relay electrode RE to the pixel electrode in the contact portion PLG3.

Although a detailed structure is described later, a capacitance made of the pixel electrode, the common electrode, and the capacitance insulating film is formed inside and outside the contact portion PLG3, and the video signal is supplied to the pixel electrode configuring the capacitance. As a result, a potential difference is generated between the pixel electrode and the common electrode, and an electric field generated based on the potential difference leaks from the slit provided in the common electrode. Also, by the transverse electric field leaking from the slit, the orientation directions of the plurality of liquid crystal molecules configuring the liquid crystal layer LC arranged on the upper side of the array substrate are controlled. As a result, transmission and shielding of light emitted from the liquid crystal layer LC are controlled in the subpixel. Such control is performed on all the subpixels arranged in the display region to display the image in the display region.

<Explanation for Related Art>

Figure 6:
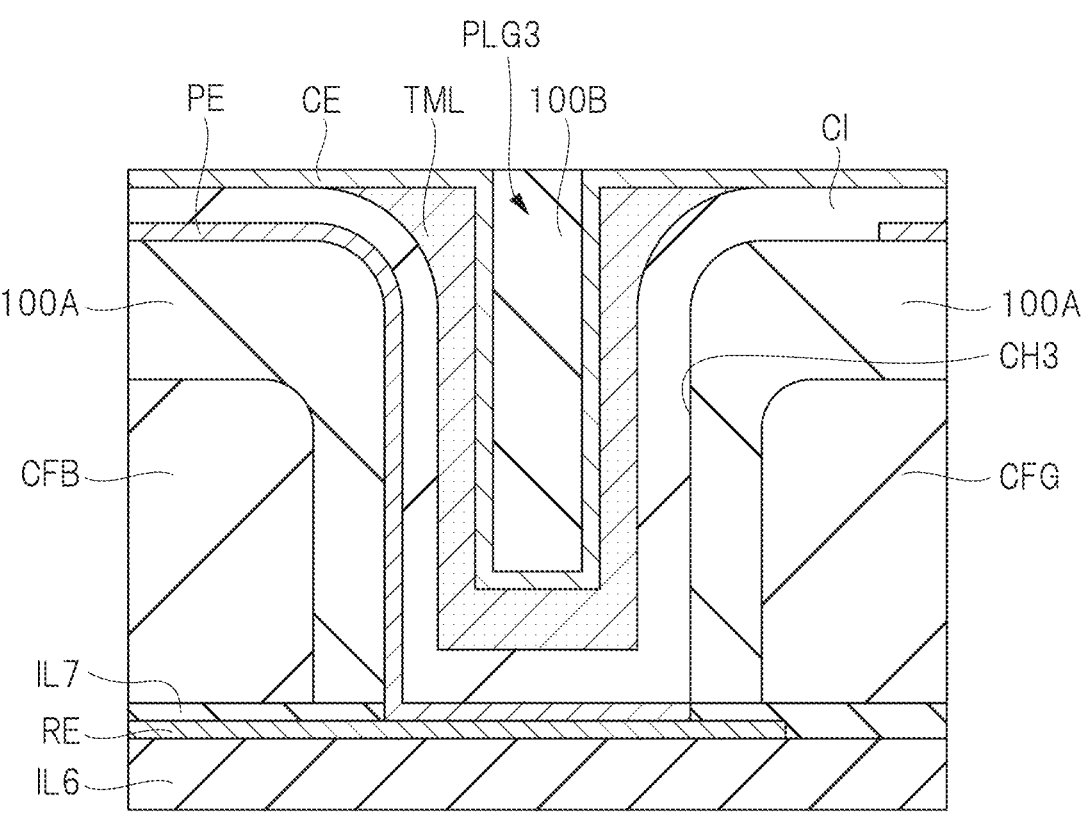
FIG. 6 is a cross-sectional view illustrating internal and external configurations of a contact portion in a related art.

Next, a related art will be explained. The "related art" described in the present specification is not a publicly-known technique but a technique that has a problem found by the present inventors, and is a technique that is a premise of the present invention. FIG. 6 is a cross-sectional view illustrating internal and external configurations of the contact portion PLG3 in the related art.

In FIG. 6, the relay electrode RE is provided on the insulating layer IL6, and the insulating layer IL7 is arranged so as to cover the relay electrode RE. The color filter CFB and the color filter CFG are provided on the insulating layer IL7. In order to flatten the roughness due to the color filter CFB and the color filter CFG, the organic insulating film 100A is provided so as to cover the color filter CFB and the color filter CFG.

And, as illustrated in FIG. 6, in the organic insulating film 100A, the contact hole CH3 penetrating the organic insulating film 100A and the insulating layer IL7 and reaching the relay electrode RE is formed. For example, the pixel electrode PE made of a light transmitting conductive material represented by ITO is formed on the inner wall of the contact hole CH3. As illustrated in FIG. 6, the pixel electrode PE is electrically connected to the relay electrode RE at the bottom portion of the contact hole CH3. Further, in the contact hole CH3, a capacitance insulating film CI being in contact with the pixel electrode PE and the inner wall of the contact hole CH3 is formed. The capacitance insulating film CI is made of, for example, a silicon nitride film. Next, the conductive film TML being in contact with the capacitance insulating film CI, the common electrode CE being in contact with the conductive film TML, and an organic insulating film 100B being in contact with the common electrode CE and filling the contact hole CH3 are formed in the contact hole CH3. As described above, the contact portion PLG3 in the related art is configured.

Here, the capacitance is made of the pixel electrode PE, the capacitance insulating film CI and the common electrode CE. When the potential difference is generated between the pixel electrode PE and the common electrode CE, the electric field is induced between the pixel electrode PE and the common electrode CE. Although not illustrated in FIG. 6, the common electrode CE is provided with the slit, and the electric field leaks from the slit to the outside of the capacitance. And, the orientation directions of the liquid crystal molecules are controlled based on the electric field leaking from the slit.

The common electrode CE is made of, for example, a light transmitting conductive material such as ITO. In order to reduce a resistance of the common electrode CE, the conductive film TML being in contact with the common electrode CE is provided. That is, the conductive film TML has a function of reducing the resistance of the common electrode CE.

Figure 7:
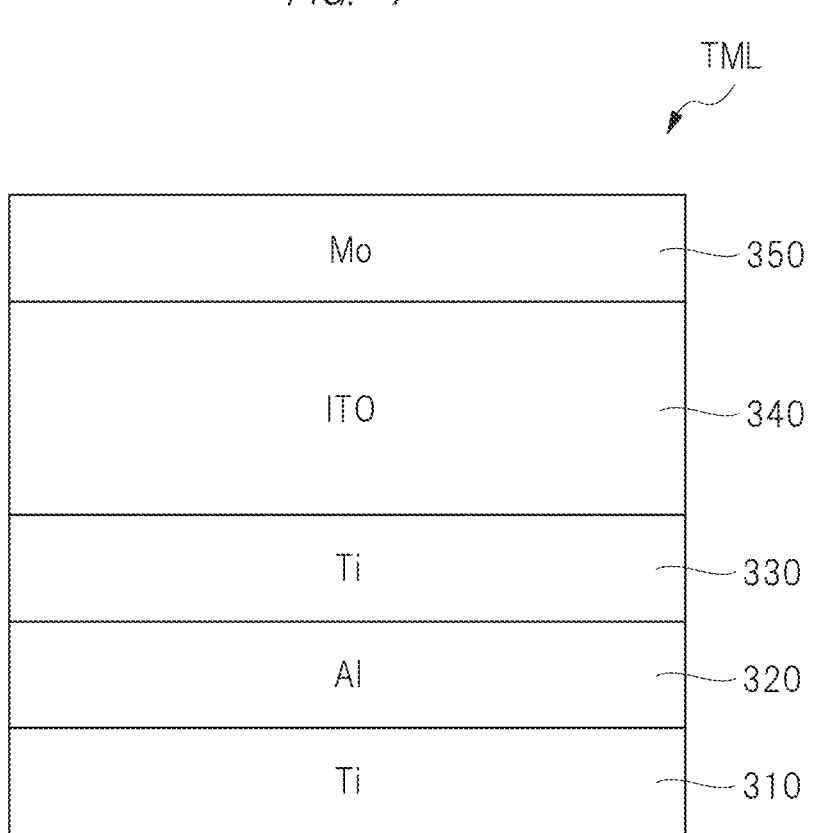
FIG. 7 is a schematic view illustrating a configuration example of a conductive film.

A configuration example of the conductive film TML will be explained below. FIG. 7 is a schematic view illustrating the configuration example of the conductive film TML.

In FIG. 7, the conductive film TML is made of a stacked film of a titanium film 310, an aluminum film 320, a titanium film 330, an ITO film 340, and a molybdenum film 350. That is, the conductive film TML is configured to include a metal film and a light transmitting conductive film (metal oxide film). For example, the titanium film 310, the aluminum film 320, the titanium film 330, and the molybdenum film 350 configuring a part of the conductive film TML are metal films having low resistance, and thus, these metal films have a function of reducing the resistance of the common electrode CE. On the other hand, the ITO film 340 is a light transmitting conductive film and is configured such that a phase difference between light transmitted via the ITO film 340 and reflected by the titanium film 330 and light reflected by the surface of the ITO film 340 is 180 degrees. As a result, the light transmitted via the ITO film 340 and reflected by the titanium film 330 and the light reflected by the surface of the ITO film 340 are offset by interference, and as a result, the reflection of the external light is suppressed. In this manner, the conductive film TML also has a function as an antireflection film that suppresses the reflection of the external light.

<Room to be Improved>

Next, a room to be improved in the related art will be explained. As illustrated in FIG. 6, in the related art, the conductive film TML is provided inside the contact hole CH3. The conductive film TML is formed by, for example, a sputtering method. In this case, a film thickness of the conductive film TML formed inside the contact hole CH3 tends to be smaller than the film thickness of a design value. For example, in the conductive film TML illustrated in FIG. 7, when the film thickness of the molybdenum film 350 becomes smaller than the design value, the reflection of the external light from the conductive film TML increases. In addition, when the film thickness of the ITO film 340 functioning as the antireflection film becomes smaller than the design value, the phase difference between the light transmitted via the ITO film 340 and reflected by the titanium film 330 and the light reflected by the surface of the ITO film 340 deviates from 180 degrees. This means that the effect of reducing reflected light due to thin film interference is reduced. That is, in the related art, since the conductive film TML is formed inside the contact hole CH3, the film thickness of the conductive film TML becomes smaller than the design value, and as a result, the reflection of the external light by the conductive film TML is observed.

As described above, the related art has a room to be improved in the viewpoint of suppressing the reflection of the external light, and this room to be improved is the findings that have been newly found by the present inventors. Therefore, first, a studied technique for overcoming the room to be improved in the related art will be explained below.

<Explanation for Studied Technique>

Figure 8:
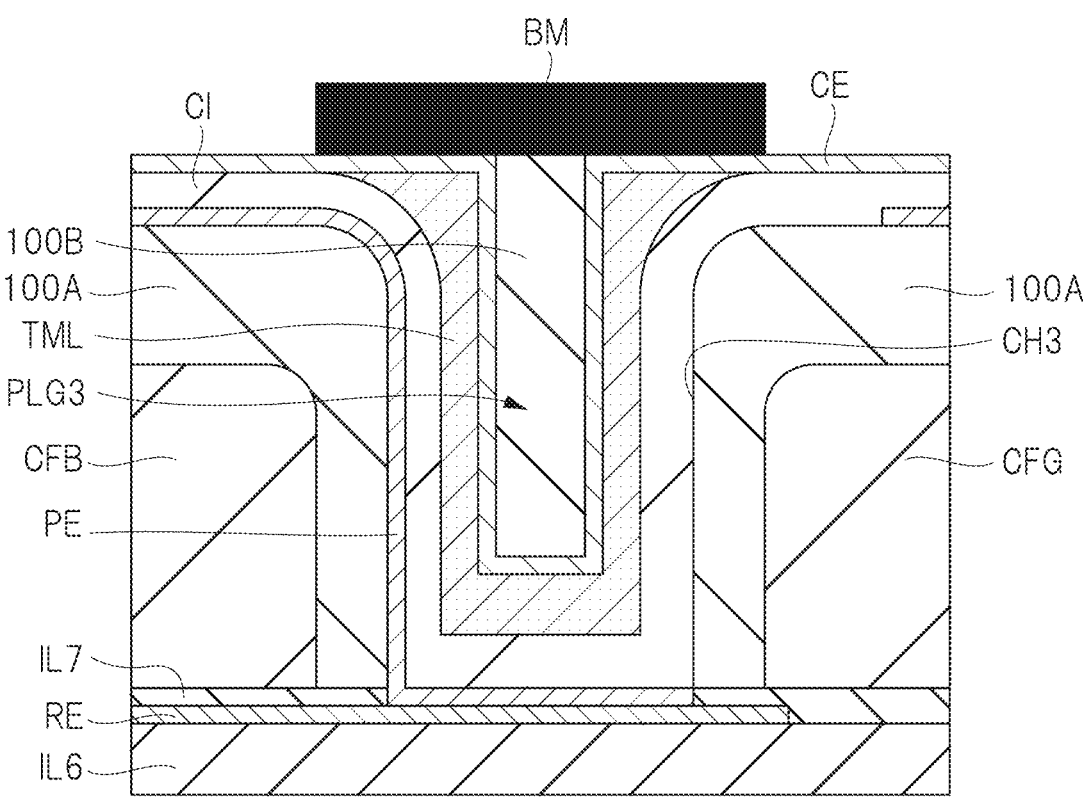
FIG. 8 is a cross-sectional view illustrating internal and external configurations of a contact portion in a studied technique.

The term "studied technique" described in the present specification is a technique that overcomes the room to be improved in the related art, and is a technique that adopts an approach different from that of the technical idea of the present embodiment. FIG. 8 is a cross-sectional view illustrating internal and external configurations of the contact portion PLG3 in the studied technique.

In FIG. 8, in the studied technique, a light shielding film BM being in contact with the organic insulating film 100B and the common electrode CE is formed in a region overlapping the contact hole CH3 in the cross-sectional view. The light shielding film BM is, for example, a light absorbing layer (light absorbing film) that absorbs light.

As a result, the external light is absorbed by the light shielding film BM before reaching the conductive film TML formed inside the contact portion PLG3. As a result, according to the studied technique, the reflection of the external light by the conductive film TML is not observed as a problem by the existence of the light shielding film BM.

That is, in the studied technique, the reflection of the external light by the conductive film TML is suppressed by the approach of forming the light shielding film BM on the upper side of the contact portion PLG3. Thus, according to the studied technique, the room to be improved in the related art can be overcome.

For example, the light shielding film BM can be made of a black matrix. This case achieves the "COA structure" including the black matrix. And, the configuration of the studied technique illustrated in FIG. 8 can be achieved by adding only the light shielding film BM to the structure of the related art illustrated in FIG. 6. For this reason, the studied technique has an advantage in which the studied technique is achieved by readily changing the related art.

<Another Room to be Improved>

As described above, the studied technique is useful because of being capable of overcoming the room to be improved in the related art. However, in the studied technique, the conductive film TML is formed inside the contact hole CH3 as similar to the related art. Based on this, the studied technique also has the following another room to be improved.

For example, if the conductive film TML is formed inside and outside the contact hole CH3, the film thickness of the conductive film TML is different between portions inside and outside the contact hole CH3. Specifically, the film thickness of the conductive film TML formed inside the contact hole CH3 is smaller than the film thickness of the conductive film TML formed outside the contact hole CH3. In other words, the film thickness of the conductive film TML formed outside the contact hole CH3 is larger than the film thickness of the conductive film TML formed inside the contact hole CH3. As a result, it is concerned that stress based on the difference in the film thickness of the conductive film TML serving as a base film is applied to the common electrode CE formed on the conductive film TML to cause "step cut in the common electrode CE".

That is, the studied technique tends to cause the phenomenon that is called "step cut" in the common electrode CE due to the following factors: (1) the formation of the conductive film TML inside and outside the contact hole CH3; and (2) the formation of the common electrode CE on the conductive film TML.

The studied technique can suppress the reflection of the external light caused by the conductive film TML because of the existence of the light shielding film BM, but has the risk of the appearance of another room to be improved such as the "step cut" in the common electrode CE because of the factors (1) and (2) described above. It is desirable to overcome another room to be improved, that is the "step cut" in the common electrode CE.

Therefore, the present embodiment adopts a devisal for overcoming both the suppression of the reflection of the external light caused by the conductive film TML and the suppression of the "step cut" in the common electrode CE. Hereinafter, the technical idea of the present embodiment with the devisal will be explained.

Basic Idea of Embodiment

Next, a basic idea of the present embodiment will be explained. The basic idea of the present embodiment is an idea of not forming the conductive film inside the contact hole but forming the conductive film on the common electrode. That is, the basic idea is an idea of not forming the conductive film on the lower side of the common electrode but forming the conductive film on the upper side of the common electrode.

According to this basic idea, first, since the conductive film is not formed inside the contact hole, the formation of the conductor film having the smaller film thickness than the design value inside the contact hole can be avoided. This means that the basic idea can suppress an increase in the reflection of the external light caused by the conductor film formed inside the contact hole, and thus, the reflection of the external light caused by the conductive film can be reduced. And, in the basic idea, on the premise that the conductive film is not formed inside the contact hole, the conductive film is not formed on the lower side of the common electrode but on the upper side of the common electrode. As a result, it is avoided to cause the difference in the film thickness of the conductive film between the portions inside and outside of the contact hole and avoided to form the conductive film as the base film of the common electrode. Thus, the basic idea can prevent the "step cut" in the common electrode.

As described above, the basic idea can overcome both the room to be improved (that is the increase in the reflection of the external light caused by the conductor film) in the related art and another room to be improved (that is the "step cut" in the common electrode) in the studied technique. Therefore, the basic idea of the present embodiment is a technical idea that is useful in that another problem as observed in the studied technique is not caused as a side effect while the problem in the related art is solved by the approach different from that of the studied technique. An embodied aspect embodying this basic idea will be explained below.

<Embodied Aspect>

Figure 9:
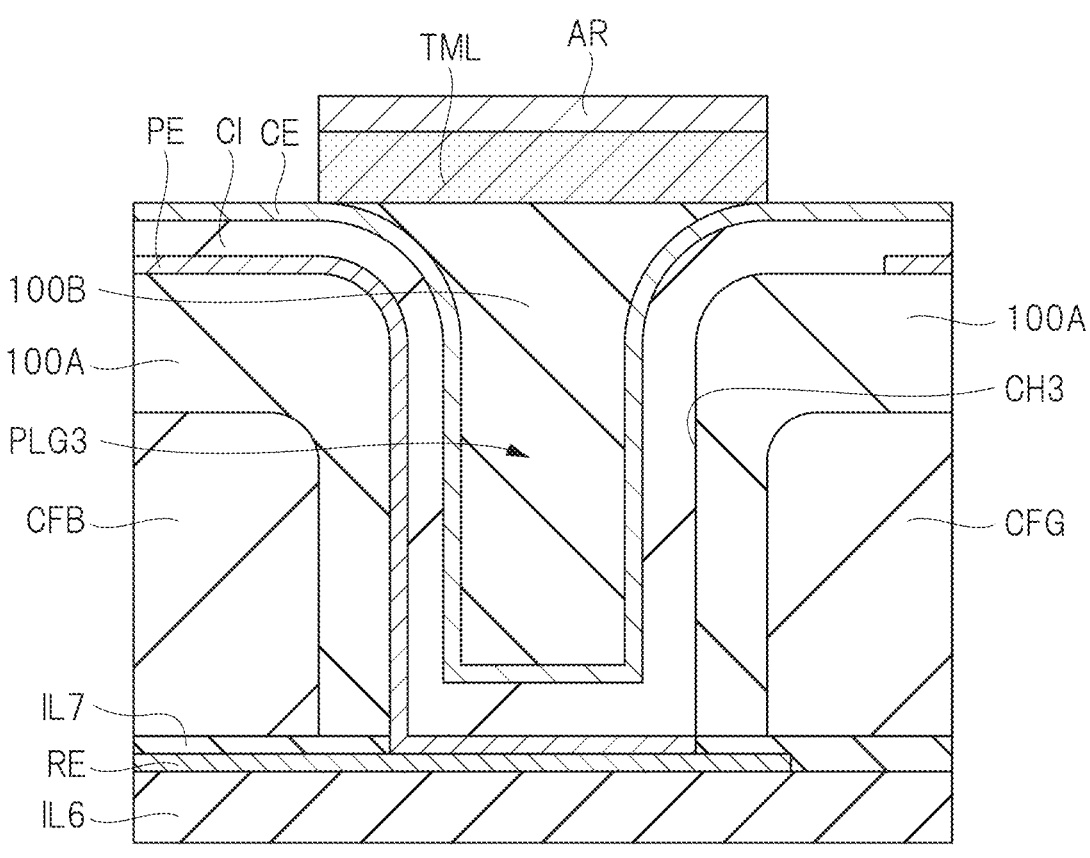
FIG. 9 is a cross-sectional view illustrating internal and external configurations of a contact portion in an embodied aspect.

FIG. 9 is a cross-sectional view illustrating internal and external configurations of the contact portion PLG3 in the embodied aspect. In FIG. 9, the relay electrode RE is provided on the insulating layer IL6. Also, the insulating layer IL7 is arranged so as to cover the relay electrode RE. The color filter CFB and the color filter CFG are provided on the insulating layer IL7. In order to flatten the roughness due to the color filter CFB and the color filter CFG, the organic insulating film 100A is provided so as to cover the color filter CFB and the color filter CFG.

And, as illustrated in FIG. 9, in the organic insulating film 100A, the contact hole CH3 penetrating the organic insulating film 100A and the insulating layer IL7 and reaching the relay electrode RE formed. For example, the pixel electrode PE made of a light transmitting conductive material such as ITO is formed on the inner wall of the contact hole CH3. As illustrated in FIG. 9, at the bottom portion of the contact hole CH3, the pixel electrode PE is electrically connected to the relay electrode RE. Further, in the contact hole CH3, the capacitance insulating film CI being in contact with the pixel electrode PE and the inner wall of the contact hole CH3 is formed. The capacitance insulating film CI is made of, for example, a silicon nitride film. Next, the common electrode CE being in contact with the capacitance insulating film CI is formed in the contact hole CH3. And, the organic insulating film 100B is formed so as to be in contact with the common electrode CE and fill the contact hole CH3.

As described above, the contact portion PLG3 filling the contact hole CH3 is formed. Next, as illustrated in FIG. 9, the conductive film TML being in contact with the organic insulating film 100B and an antireflection film AR being in contact with the conductive film TML are provided on the upper side of the contact portion PLG3.

Here, the conductive film TML has a resistance value lower than a resistance value of the common electrode CE. In FIG. 9, note that the conductive film TML is apparently not in contact with the common electrode CE. However, in a plan view in consideration of planar expansion, the conductive film TML includes a portion being in contact with the common electrode CE. Thus, the conductive film TML functions as a common auxiliary electrode that reduces the resistance of the common electrode CE.

For example, the conductive film TML is configured to include a metal film having light shielding property and a metal oxide film being in contact with the metal film. For example, the conductive film TML is made of a stacked film as illustrated in FIG. 7. Specifically, the conductive film TML is made of a stacked film of the titanium film 310, the aluminum film 320, the titanium film 330, the ITO film 340, and the molybdenum film 350.

Each of the pixel electrode PE, the common electrode CE, and the antireflection film AR is made of a metal oxide film (such as an ITO film) having light transmitting property. As described above, the inner and outer configurations of the contact portion PLG3 in the embodied aspect are achieved.

<<Feature Points of Embodied Aspect>>

Next, feature points of the embodied aspect will be explained. The first feature point of the embodied aspect is, for example, that the conductive film TML is not formed inside the contact hole CH3 and is formed on the upper side of the common electrode CE in the cross-sectional view as illustrated in FIG. 9. That is, in the first feature point, the conductive film TML is not a component of the contact portion PLG3 and is formed on the upper side of the contact portion PLG3.

As a result, first, the conductive film TML is not formed inside the contact hole CH3. Therefore, it is possible to suppress the increase in the reflection of the external light caused by the conductive film TML due to the smaller film thickness of the conductive film TML formed inside the contact hole CH3 than the design value. That is, according to the first feature point, since the conductive film TML is not formed in the contact hole CH3, it is possible to suppress the increase in the reflection of the external light caused by the conductive film TML formed in the contact hole CH3.

Further, according to the first feature point, the conductive film TML is formed on not the lower side of the common electrode CE but the upper side of the common electrode CE. Therefore, the "step cut" in the common electrode CE due to the film thickness difference of the conductive film TML does not occur. This is because the "step cut" in the common electrode CE is a phenomenon that occurs when the conductive film TML is formed on the lower side of the common electrode CE, and does not occur when the conductive film TML is formed on the upper side of the common electrode CE as described in the first feature point. Therefore, by the adoption of the first feature point, it is not required to consider the "step cut" caused by the conductive film TML, and thus, the studied technique does not have another room to be improved.

As described above, the first feature point can overcome the room to be improved in the related art or the studied technique. Therefore, the first feature point of the embodied aspect is excellent in that the increase in the reflection of the external light can be suppressed without causing side effects.

Next, a second feature point of the embodied aspect is that, for example, the antireflection film AR is provided on the conductive film TML as illustrated in FIG. 9. Therefore, the reflection of the external light on the surface of the conductive film TML can be suppressed, and as, a result, the visible recognition of the display apparatus can be improved.

For example, as illustrated in FIG. 7, the conductive film TML is made of a stacked film of the titanium film 310, the aluminum film 320, the titanium film 330, the ITO film 340, and the molybdenum film 350. In this case, since the molybdenum film 350 is arranged on the uppermost layer of the conductive film TML, it is considerable that the external light reflected on the surface of the molybdenum film 350 exists.

In this regard, in the second feature point, the antireflection film AR is arranged on the molybdenum film 350. And, the antireflection film AR is made of, for example, a light transmitting conductive material represented by an ITO film, and is designed to have the film thickness such that the phase difference between the light reflected on the surface of the antireflection film AR and the light transmitted via the antireflection film AR and then reflected on the surface of the molybdenum film 350 is 180 degrees.

As a result, the second feature point can effectively suppress the reflection of the external light, and, as a result, the visible recognition of the display apparatus can be improved. From the above, according to the embodied aspect, by combining the first feature point and the second feature point described above, the reflection of the external light can be effectively suppressed without causing the "step cut" in the common electrode CE. As a result, according to the embodied aspect, the visible recognition can be improved while the reliability of the display apparatus can be improved.

Modification Example

Figure 10:
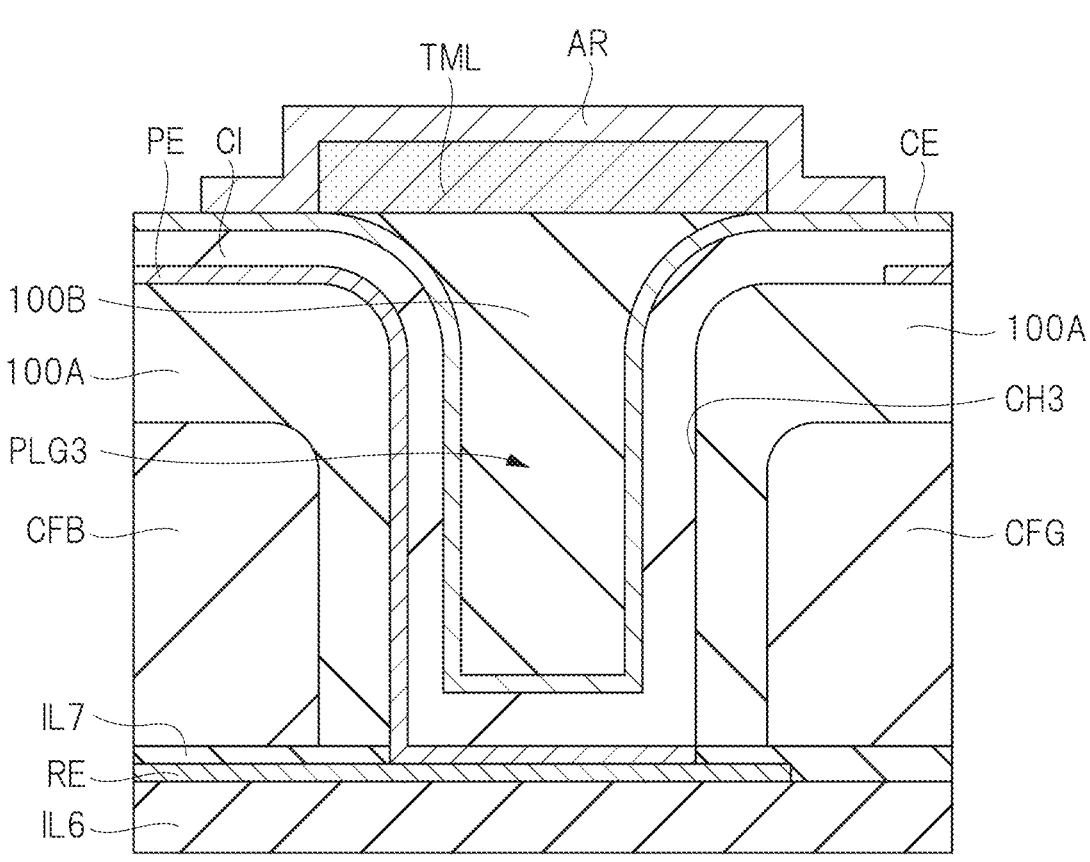
FIG. 10 is a cross-sectional view illustrating internal and external configurations of a contact portion in a modification example.

Next, the present modification example will be explained. FIG. 10 is a cross-sectional view illustrating internal and external configurations of the contact portion PLG3 in the present modification example. As illustrated in FIG. 10, in the present modification example, the antireflection film AR is provided so as to cover the conductive film TML, and the antireflection film AR is also in contact with the common electrode CE.

A state of the antireflection film AR configured as described above, the state covering the conductive film TML, can be maintained even if the alignment deviation occurs in the patterning between the antireflection film AR and the conductive film TML. From this, according to the present modification, even if the alignment deviation due to the patterning occurs, the conductive film TML is not exposed from the antireflection film AR, and therefore, the reflection of the external light can be reliably suppressed.

In the scope of the idea of the present invention, various modification examples and alteration examples could have been easily anticipated by those who are skilled in the art, and it would be understood that these various modification examples and alteration examples are within the scope of the present invention. For example, the ones obtained by appropriate addition, removal, or design-change of the components to/from/into each of the above-described embodiments by those who are skilled in the art or obtained by addition, omitting, or condition-change of the step to/from/into each of the above-described embodiments are also within the scope of the present invention as long as they include the idea of the present invention.

In addition, it would be understood that, among other operations and effects caused by the aspects described in the embodiments, clear operations and effects from the present specification or operations and effects appropriately conceived by those skilled in the art are obviously brought by the present invention. The embodiments include the following aspects.

(Statement 1)

A display apparatus includes: a first organic insulating film; a pixel electrode being in contact with the first organic insulating film; a capacitance insulating film being in contact with the pixel electrode; a conductive film being in contact with the capacitance insulating film; and a common electrode being in contact with the conductive film. The first organic insulating film is provided with a contact hole. The contact hole includes: the pixel electrode being in contact with an inner wall of the contact hole; the capacitance insulating film being in contact with the inner wall of the contact hole and the pixel electrode; the conductive film being in contact with the capacitance insulating film; the common electrode being in contact with the conductive film; and a second organic insulating film being in contact with the common electrode and filling the contact hole, that are formed therein. An upper side of the contact hole includes: a light shielding film being in contact with the second organic insulating film and the common electrode, that is formed therein.

(Statement 2)

In the display apparatus described in Statement 1, the light shielding film is a black matrix.

(Statement 3)

In the display apparatus described in Statement 1, the conductive film has a resistance value lower than a resistance value of the common electrode. The conductive film includes: a metal film; and a metal oxide film being in contact with the metal film.

(Statement 4)

In an array substrate including a switching element, the array substrate includes: a first organic insulating film; a pixel electrode being in contact with the first organic insulating film; a capacitance insulating film being in contact with the pixel electrode; a conductive film being in contact with the capacitance insulating film; and a common electrode being in contact with the conductive film. The first organic insulating film is provided with a contact hole. The contact hole includes: the pixel electrode being in contact with an inner wall of the contact hole; the capacitance insulating film being in contact with the inner wall of the contact hole and the pixel electrode; the conductive film being in contact with the capacitance insulating film; and the common electrode being in contact with the conductive film; and a second organic insulating film being in contact with the common electrode and filling the contact hole, that are formed therein. An upper side of the contact hole includes: a light shielding film being in contact with the second organic insulating film and the common electrode, that is formed therein.

What is claimed is:

1. A display apparatus comprising:
a first organic insulating film;
a pixel electrode being in contact with the first organic insulating film;
a capacitance insulating film being in contact with the pixel electrode;
a common electrode being in contact with the capacitance insulating film;
a conductive film being in contact with the common electrode; and
an antireflection film being in contact with the conductive film, wherein the first organic insulating film is provided with a contact hole, the contact hole includes:

the pixel electrode being in contact with an inner wall of the contact hole;

the capacitance insulating film being in contact with the inner wall of the contact hole and the pixel electrode, the common electrode being in contact with the capacitance insulating film; and a second organic insulating film being in contact with the common electrode and filling the contact hole, that are formed therein, and an upper side of the contact hole includes:

the conductive film being in contact with the second organic insulating film; and the antireflection film being in contact with the conductive film, that are formed therein.

2. The display apparatus according to claim 1, wherein the antireflection film is provided so as to cover the conductive film, and the antireflection film is also in contact with the common electrode.

3. The display apparatus according to claim 1, wherein the conductive film has a resistance value lower than a resistance value of the common electrode.

4. The display apparatus according to claim 1, wherein the conductive film includes:

a metal film; and a metal oxide film being in contact with the metal film.

5. The display apparatus according to claim 1, wherein each of the pixel electrode, the common electrode and the antireflection film is made of a metal oxide film having light transmitting property.

6. An array substrate including a switching element, the array substrate comprising:

a first organic insulating film;

a pixel electrode being in contact with the first organic insulating film;

a capacitance insulating film being in contact with the pixel electrode;

a common electrode being in contact with the capacitance insulating film;

a conductive film being in contact with the common electrode; and an antireflection film being in contact with the conductive film, wherein the first organic insulating film is provided with a contact hole, the contact hole includes:

the pixel electrode being in contact with an inner wall of the contact hole;

the capacitance insulating film being in contact with the inner wall of the contact hole and the pixel electrode;

the common electrode being in contact with the capacitance insulating film; and a second organic insulating film being in contact with the common electrode and filling the contact hole, that are formed therein, and an upper side of the contact hole includes:

the conductive film being in contact with the second organic insulating film; and the antireflection film being in contact with the conductive film, that are formed therein.

7. The array substrate according to claim 6, wherein the antireflection film is provided so as to cover the conductive film, and the antireflection film is also in contact with the common electrode.

8. The array substrate according to claim 6, wherein the conductive film has a resistance value lower than a resistance value of the common electrode, and the conductive film includes:

a metal film; and a metal oxide film being in contact with the metal film.

9. The array substrate according to claim 6, wherein the switching element is made of a thin film transistor, and the array substrate includes:

a relay electrode being connected to a drain of the thin film transistor; and the pixel electrode being connected to the relay electrode at a bottom portion of the contact hole.

10. The array substrate according to claim 6, further comprising:

a color filter covered with the first organic insulating film.

* * * * *